Aug. 22, 1961 W. A. LOREE 2,996,841
APPARATUS FOR TREE TREATMENT AND FERTILIZING
Filed Aug. 17, 1959
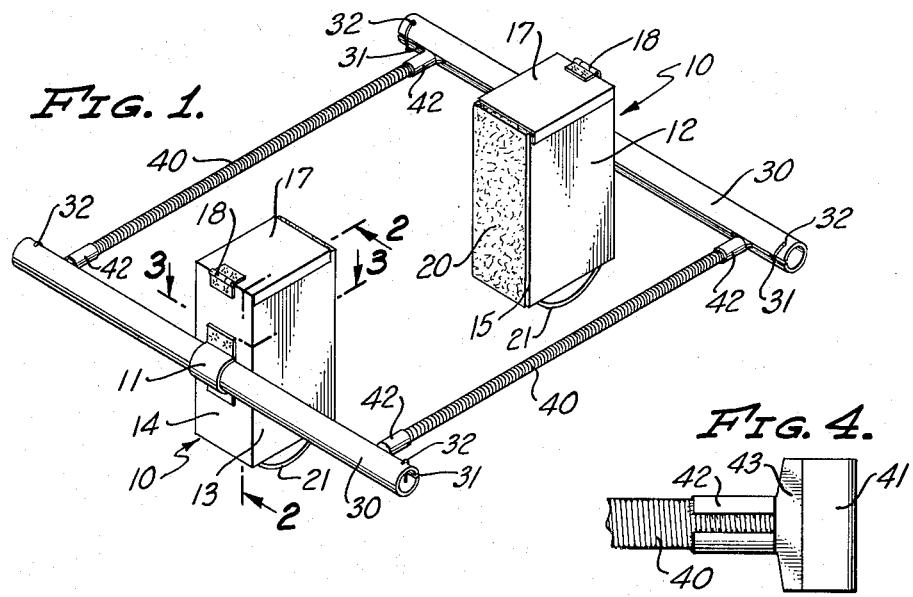
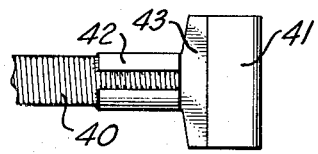
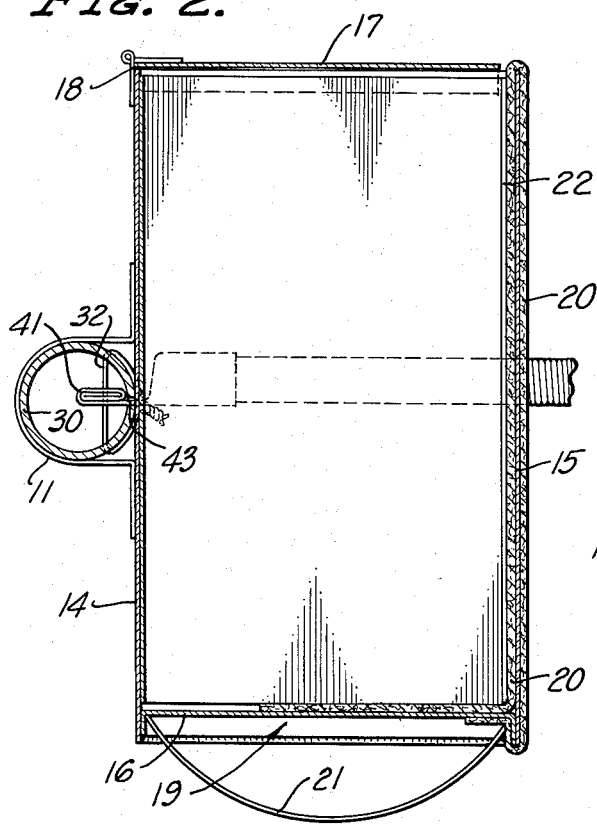
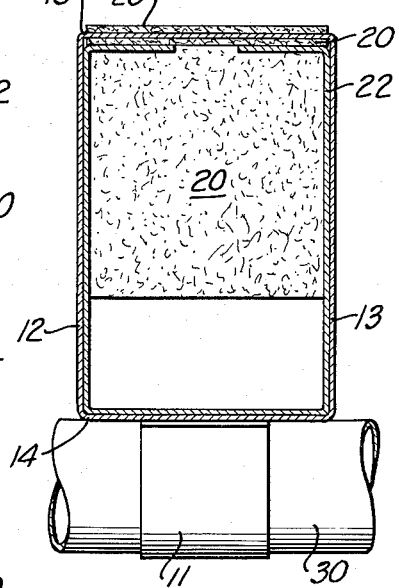
INVENTOR.
WILLIAM A. LOREE
BY
ATTORNEY

United States Patent Office 2,996,841
Patented Aug. 22, 1961

2,996,841
APPARATUS FOR TREE TREATMENT AND FERTILIZING
William A. Loree, P.O. Box 284, Corona, Calif.
Filed Aug. 17, 1959, Ser. No. 834,039
3 Claims. (Cl. 47—1)

This invention relates generally to the care of trees and more particularly to an improved apparatus for treating tree diseases by direct application of fluids to the bark.

There are certain diseases of trees which are best treated by the application of certain fertilizing and/or medicinal type preparations. In general, such preparations are applied by conventional means either through sprays or through application to the soil.

Each of these methods is only a means of approximating the amount of such medication or fertilization as such a tree might utilize and obtain and each requires considerable work and apparatus in proper application.

I have devised a method and apparatus through the use of which measured amounts of fertilizer or other preparations may be applied directly to the bark of the tree and to the ground root of the tree, and, thus, the amount of such preparation may be closely measured and controlled for maximum results.

In my method, reservoirs containing the desired material are removably fastened to the trunk or to a limb of the tree. A dispensing wick is in direct contact with such areas as may be desired and through capillary attraction the dispensing wick draws the material gradually from the reservoirs and feeds it through the pores of the outer bark of the tree.

Thus, it is a major object of my invention to provide a method and mechanism for applying liquids directly into the bark of a tree.

It is a further object of my invention to provide a mechanism for applying carefully controlled quantities of liquid materials directly into the bark of a tree.

It is still a further object of my invention to provide an apparatus as described which can be conveniently and economically utilized.

The foregoing and other objects and advantages of my invention will be apparent to those skilled in the art by reading the following specification in conjunction with the attached drawings in which:

FIGURE 1 is a perspective of a preferred embodiment of my invention;
FIGURE 2 is a section through 2—2 of FIGURE 1;
FIGURE 3 is a section through 3—3 of FIGURE 1;
FIGURE 4 is an enlarged fragmentary view of one of the ends of one of the connecting arms, removed from the supporting bar.

This device consists of two identical containers 10, each fastened to identical bars 30 by straps 11 as shown. Each of the containers 10 is generally rectangular in shape, having four sides 12, 13, 14 and 15 and a bottom 16.

Each of the containers has a top 17 fastened to back side 14 by suitable hinge 18.

The bottom of the container is so constructed as to have shoulders extending below the level 16 of the bottom so as to form a rectangular cavity 19 under the container.

A strip of felt or the like 20 runs from the inside of the container over the top edge between the hinged top 17 and the front 15 and along the front 15 for its full length and is looped back under the lower portion of the front edge and into the rectangular cavity 19. A length of spring steel or the like 21 is compressed between the front and rear edges of said cavity 19 and against the said felt 20 so as to hold the same in position.

A rectangular sleeve 22 having outer dimensions slightly less than the inner dimensions of said container 10 is slipped into said container 10 in such manner that the edges thereof hold the lower portion of wick 20 upon the bottom edge 16 of container 10 and allow the said wick 20 to pass upward out of said container 10 between the front 15 thereof and the said sleeve 22 as shown.

Each support arm 30 comprises a length of tubing having a slot 31 extending a short distance on one side at each end of said rod 30 and each rod has a cotter pin or the like 32 near each end of each rod as indicated.

Two identical springs 40, each having a tab 41 fastened at each end thereof by suitable welding or the like to a sleeve 42 hold the said device together.

The tab 41 may be formed of a series of folds in a piece of strap metal as shown in the illustration or by any other suitable means such that a slender connecting portion 43 attached between the tab 41 and the sleeve 42 may slide freely within the slot 31 in each end of each of said bars. Each of said tabs may be prevented from sliding outward from connection with said bar by the cotter pin or the like 32 which may be removed or replaced at will.

In usage, one of the cotter pins 32 is moved from one end of one of the supporting bars 30 and the tab 41 is slid outward through the slot 31 so that it is completely disengaged. One of the boxes 10 is placed upon one side of a tree trunk with the felt 20 in contact with said tree trunk and the other box is placed in contact with the other side of said tree trunk opposed to the first said box. The tab 41 is then slid into the slot 31 and the cotter pin 32 placed in position to maintain the tab in its position. The tension of the springs 40 holds the two boxes 10 in contact with two sides of the trunk.

A fluid is placed within the containers 10 and said fluid gradually passes through the wick and into contact with the tree trunk where it is slowly absorbed by the tree.

While the embodiment of my invention shown and described is fully capable of performing the objects and advantages desired, it will be clear to those skilled in the art that many modifications may be made without departing from the inventive concept disclosed and it is not my intention to be limited by these specific embodiments shown.

I claim:
1. A device of the character described comprising a plurality of containers; each of said containers having a wick extending from the inside to the outside; each of said containers fastened to a support arm; and said support arms each fastened to one end of each of a pair of springs.

2. A device of the character described comprising a first container, having a wick fastened on the inside thereof and extending outward over one face of said container and means to hold said wick in firm contact with said container, a support bar fastened to said container, a spring fastened to each end of said support bar, each of the opposite ends of each of said springs fastened to a second support bar, a second container identical to the first said container fastened to said support bar, said containers being fastened in such manner that the wicks face one another; and means to remove said springs from said support bars.

3. A device of the character described comprising a first rectangular liquid container, having a hinged top, a sleeve suitable to slide inside of said container; a wick suitable to be held in place within said container between the inside surfaces thereof and the said sleeve, said wick extending over the front edge of said container and along the front side thereof and under the lower edge thereof, a spring holding said wick at the lower edge of said container, a bar fastened to the side of said container opposite the side upon which said wick extends, spring means fastened to one end of said bar, spring means fastened to the other end of said bar; the opposite ends of each of said spring means being fastened to a like second support bar; and said second support bar being fastened to a second container identical to said first container, said second container being fastened in such manner as the two sides of said containers covered by said wicks face one another.

References Cited in the file of this patent

UNITED STATES PATENTS

| | | |
|---|---|---|
| 116,001 | Gilbert | June 13, 1871 |
| 989,325 | Bremer | Apr. 11, 1911 |
| 1,740,484 | Von Behr | Dec. 24, 1929 |
| 2,217,557 | Mac Fee | Oct. 8, 1940 |
| 2,947,111 | Zobrist | Aug. 2, 1960 |